A. C. M. RUSSELL.
GRAPE SHEARS.
APPLICATION FILED JULY 17, 1914.
1,123,929.
Patented Jan. 5, 1915.
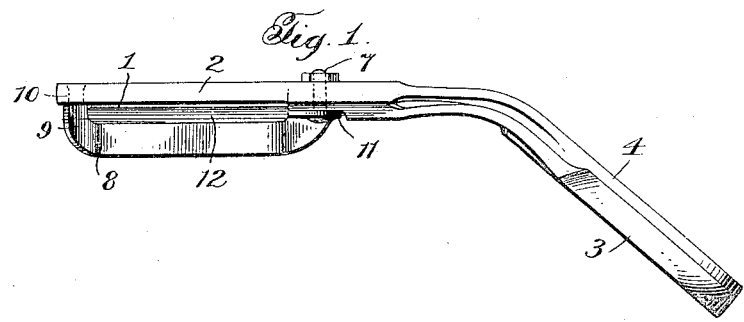
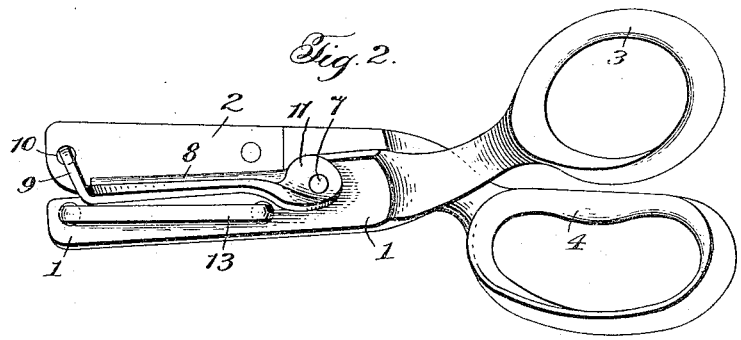
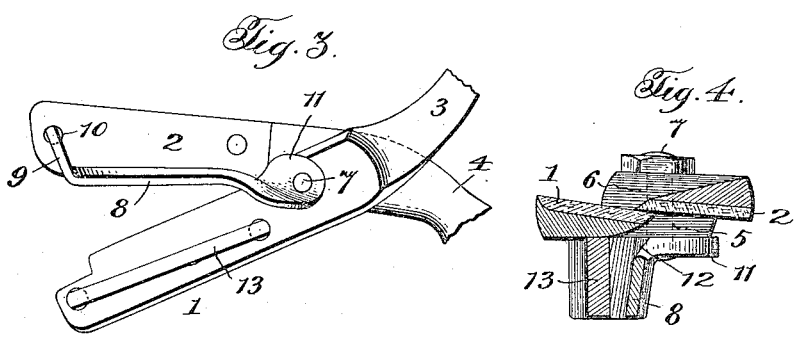 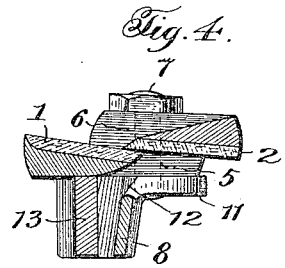
Witnesses:
Jas. E. Hutchinson
H. N. Ramsey
Inventor:
Alexander C. M. Russell,
By Joseph H. Hunter, Attorney.

UNITED STATES PATENT OFFICE.

ALEXANDER C. M. RUSSELL, OF BENTON HARBOR, MICHIGAN.

GRAPE-SHEARS.

1,123,929. Specification of Letters Patent. Patented Jan. 5, 1915.

Application filed July 17, 1914. Serial No. 851,469.

*To all whom it may concern:*

Be it known that I, ALEXANDER C. M. RUSSELL, a citizen of the United States, residing at Benton Harbor, in the county of Berrien and State of Michigan, have invented certain new and useful Improvements in Grape-Shears, of which the following is a specification, reference being had therein to the accompanying drawing.

The present invention relates to improvements in a fruit picking implement, and is primarily adapted for use in the cutting of bunches of grapes, but may be very conveniently used for the picking of any other fruit.

The object of my invention is to provide an improvement in fruit picking implements, consisting of pivotally connected blade members, and provided with clamping blocks carried by the blades, to grip the stem of the fruit after the same has been cut, thereby enabling the user to pick and hold the bunches of grapes with the use of one hand, and carry the receptacle for the grapes with the other hand.

It has been found that when bunches of grapes are cut by ordinary shears, or the picking implements now in use, the end of the vine is not in any way twisted or bent, and the sap soon leaves the vine, which causes the grapes to decay much sooner than if the sap were held in the stem. To overcome this difficulty, the invention has for one of its objects the arrangement of the clamping members so that when the fruit is cut the stem is twisted or clenched by the action of the blade and clamping members to hold the sap within the stem, which greatly preserves the grapes.

The invention consists also in certain details of construction and novel combination and arrangement of parts, as will be fully described and hereinafter pointed out.

In the drawings:—Figure 1 is a side view of my improved grape shears; Figs. 2 and 3 are bottom plan views of the same, showing respectively the blades closed and open, and Fig. 4 is an enlarged cross section through the blades in the closed position.

Referring to the drawings, the numerals 1 and 2 represent the cutting blades or jaws, provided with the handles 3 and 4, by means of which the said jaws are operated in practically the same manner as an ordinary pair of shears. The handle portions are bent out of the plane of the cutting blades, as illustrated in the drawings, to enable the operator to more readily reach the grapes.

The blade members 1 and 2 near their inner edges are provided with apertures 5 and 6 for the reception of the usual pivot pin 7.

Arranged on one side of the blade members 1 and 2 is a flat resilient clamping plate 8, the said clamping plate being in substantially the same plane as the cutting edge 1.

Extending outwardly from the clamping plate 8 is an ear 9, which is rigidly secured to the blade 2 by a pin 10. The opposite end of the clamping plate is also provided with an outstanding ear or lug 11, provided with an aperture and adapted to be secured to the pivot pin 7 on the outside of the blade members 1 and 2.

It will be observed that the outstanding portions 9 and 11 are so arranged with respect to the cutting blades that the clamping member 8 is offset from the blades 1 and 2 to provide an opening 12, to permit the passage of the blade 1 therethrough.

Rigidly secured to the blade 1 and positioned slightly below the cutting edge thereof is a gripping block 13, adapted to contact with the plate 8 to clamp the stem of the fruit after the same has been severed.

In operation, the cutting blades move in the same manner as the ordinary shears through the medium of the handles 3 and 4, and the clamping plate 8 by being offset from the said cutting blades, provides an opening 12 so that when the stem is cut, the said stem is forced against the inside edge of the clamping member 8 by the side of the blade 1, which crimps or twists the severed end of the stem to prevent the sap from leaving the vine. The stem after being twisted is then clamped or held by the clamping plates 8 and 11, as hereinbefore described.

Having thus described the invention, what is claimed is:

1. In a fruit picker comprising a pair of pivoted cutting blades, gripping members carried by said cutting blades adapted to grip the severed stem, one of said gripping members spaced from its blade member thereby providing an opening for the passage of the opposing blade member.

2. In a fruit picker comprising a pair of cutting blades, gripping members carried by said cutting blades, one of said gripping members arranged below the cutting edge of its blade member, and the opposing gripping member mounted on substantially the same plane as the cutting edge and spaced from its blade member thereby providing an opening for the passage of the opposing blade member whereby the severed stem is twisted.

In testimony whereof I affix my signature in presence of two witnesses.

ALEXANDER C. M. RUSSELL.

Witnesses:
 F. STREICH,
 FRED FELTON.

Copies of this patent may be obtained for five cents each, by addressing the "Commissioner of Patents, Washington, D. C."